US006894232B2

(12) United States Patent
Waggoner et al.

(10) Patent No.: US 6,894,232 B2
(45) Date of Patent: May 17, 2005

(54) BAGGER SCALE

(75) Inventors: Dana D. Waggoner, Columbus, OH (US); Delbert J. Graf, Worthington, OH (US)

(73) Assignee: Mettler-Toledo, Columbus, OH (US)

( * ) Notice: Subject to any disclaimer, the term of this patent is extended or adjusted under 35 U.S.C. 154(b) by 121 days.

(21) Appl. No.: 10/217,297

(22) Filed: Aug. 12, 2002

(65) Prior Publication Data

US 2004/0026134 A1 Feb. 12, 2004

(51) Int. Cl.[7] .................. G01G 19/00; G01G 19/52
(52) U.S. Cl. ................. 177/25.15; 177/160; 177/161; 177/177; 177/238; 235/383
(58) Field of Search ................. 177/160, 161, 177/238–244, 25.15, 177; 235/383

(56) References Cited

U.S. PATENT DOCUMENTS

| | | | | |
|---|---|---|---|---|
| 112,522 A | * | 3/1871 | Zimmerman | 177/160 |
| 138,315 A | * | 4/1873 | Budge et al. | 177/160 |
| 189,852 A | * | 4/1877 | Flanders | 177/160 |
| 270,094 A | * | 1/1883 | Moore | 177/160 |
| 495,897 A | * | 4/1893 | Maxhimer | 177/160 |
| 502,265 A | * | 8/1893 | Abercrombie | 177/160 |
| 1,019,685 A | * | 3/1912 | Millard | 177/160 |
| 1,230,734 A | * | 6/1917 | Lilja | 248/99 |
| 4,708,216 A | * | 11/1987 | Spiess | 177/160 |
| 5,083,638 A | * | 1/1992 | Schneider | 186/61 |
| 5,115,888 A | * | 5/1992 | Schneider | 186/61 |
| 5,143,154 A | * | 9/1992 | Mody et al. | 277/334 |
| 5,143,164 A | * | 9/1992 | Nahar | 177/50 |
| 5,410,108 A | * | 4/1995 | Williams et al. | 177/25.15 |
| 5,488,202 A | * | 1/1996 | Baitz et al. | 177/25.15 |
| 5,952,642 A | * | 9/1999 | Lutz | 235/383 |
| 5,990,794 A | * | 11/1999 | Alicot et al. | 340/573.1 |
| 6,154,135 A | * | 11/2000 | Kane et al. | 340/572.3 |

* cited by examiner

Primary Examiner—Randy W. Gibson
(74) Attorney, Agent, or Firm—Jeffrey Furr

(57) ABSTRACT

The invention is a device and means that reduces the amount of overloading and under-loading of plastic grocery bags. A bag rack has a scale attached to its base with the scale connected to an indicator. The plastic bag rests on the scale which weighs the contents of the bag as they are being added. The indicator checks the weight of the contents of the bag. If the contents are under the targeted weight an indicator is lit, when the targeted weigh is reached another indicator is lit, and if a "not to exceed weight" is reached a warning indicator is lit.

22 Claims, 7 Drawing Sheets

BAGGER SCALE

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to the art of weighing scales, and more specifically to weighing scales utilized for weighing bags used to hold and carry things such as groceries.

2. Description of Prior Art

Recently the use of plastic bags to load and carry groceries has added many benefits to retail shops and stores. The bags are easier to use and to carry items such as groceries in. There are numerous economic advantages to the use of such plastic bags.

The use of these plastic bags have presented problems as well. One of the major problems is the overloading/underloading of the plastic bags. If the bags are overloaded they may break causing the contents to spill out and potentially break. This causes a problem for the customers of the store. If the bags are under-loaded, the store is using too many bags and having a detrimental environment effect. For a chain of stores that uses millions of bags a year a 10, percentage under filling can cost the chain millions of dollars.

U.S. Pat. No. 6,167,381 by Swaine, et al., issued on Dec. 26, 2000, is a "Self-service checkout terminal." It discloses a self-service checkout terminal and includes a base having a bag-well defined. This patent has a bag scale that can weigh a multiple of grocery bags. It is not defined in great detail in the patent. The bag scale is positioned below the bag-well and is used for security purposes.

U.S. Pat. No. 6,215,078 by Torres, et al., issued Apr. 10, 2001, is for a "Method and apparatus for determining a stable weight measurement for use in a security software application of a self-service checkout terminal." It discloses a method of operating a retail terminal having a weight scale associated therewith including the step of executing a security software application so as to provide security to the retail terminal during operation thereof. This invention has a number of different scales but none that seem to be similar to the Integrated Indicator/LED Panel with Scale Base example for Bag Weigher.

U.S. Pat. No. 6,047,262 by Lutz, issued on Apr. 4, 2000, is for a "Method for providing security and enhancing efficiency during operation of a self-service checkout terminal." It discloses a method of providing security for a self-service checkout terminal including the step of determining a time-of-day value and a day-of-week value. As with the previous patent, this invention has scales associated with it but none that seem to be similar to the Integrated Indicator/LED Panel with Scale Base example for Bag Weigher.

U.S. Pat. No. 6,189,789 by Levine, et al., issued Feb. 20, 2001, is for a "Method and system for a merchandise checkout system." It is a method and system for a merchandise checkout system utilizing a remote scanning device, a shopping cart and bags for allowing a purchaser to buy merchandise unassisted by store personnel. The purchaser upon completion of their purchases takes their shopping cart to a security station for weighing in on a scale wherein an actual combined weight of the shopping cart, bags and products is compared to a predicted weight determined by the central processor and generating a notification signal if a discrepancy occurs.

U.S. Pat. No. 5,630,310 by Chadwell, issued on May 20, 1997, is an "Automatic ice bagger with self-contained sanitizing system." U.S. Pat. No. 5,581,982 by Schroeder, et al., issued on Dec. 10, 1996, is for a "Method for automatically bagging ice using a timer and multi-positional electronic scale." They disclose ice bagger comprising an ice maker, an ice bagging unit which includes an automatic sanitation system, and a merchandiser. A scale supports the bag during its filling to measure the weight of the ice delivered into the bag from the hopper. When the scale registers the desired amount of ice, the auger ceases to deliver ice from the hopper into the delivery chute.

U.S. Pat. No. 5,168,961 by Schneider, issued on Dec. 8, 1992, is for a "Supermarket with self-service checkout." It discloses the incorporation of self-serve checkout systems within a supermarket. The installation of self-serve checkout systems is shown whereby the productivity of the supermarket is maintained, no significantly increased floorspace requirements occur, the human supervisor of the self-serve checkout systems is able to strategically carry out his/her duties and the co-existence with conventional checkout lanes is allowed. As well, a method and apparatus for integrating a labor savings car order bag handling system with the checkout lanes of the supermarket is shown. In addition, a method and apparatus for augmenting the checkout productivity of produce items is shown.

U.S. Pat. No. 4,953,664 by Vrooman, et al., issued on Sep. 4, 1990, is for an "Ergonomically designed check-out counter system for supermarket and merchandising industries." It discloses an ergonomically designed check-out counter system for supermarket and merchandising industries that is characterized by provisions for differences in human heights, hand and position of operators and for ease in handling of merchandise to reduce fatigue and injury to the operators while providing maximum productivity under both light and heavy through put requirements.

The problem of under-filling and overfilling of plastic grocery bags leaves room for improvement within the art.

1. Field of the Invention

U.S. Class 177-45

2. Description of Related Art Including Information Disclosed Under 37 CFR § 1.97** > and 1.98<.

SUMMARY OF THE INVENTION.

An object of the present invention is to provide a means to load plastic grocery bags which minimizes or reduces the amount of overloading and under-loading of the bags.

The inventor of the present invention has produced a means that reduces the amount of overloading and underloading of plastic grocery bags. According to one aspect of the invention, the bag rack has a scale attached to its base with the scale connected to an indicator. The plastic bag rests on the scale which weighs the contents of the bag as they are being added. The indicator checks the weight of the contents of the bag. If the contents are under the targeted weight a green light on the indicator is lit, when the targeted weigh is reached a yellow light is lit, and if a "not to exceed weight" is reached the indicator lights a red light.

By providing a bag rack with a scale and an indicator, the inventor has provided an easy and efficient way to make sure that the plastic grocery bags are filled to their optimal weight, thus solving, or at least reducing, the problems herein explained.

BRIEF DESCRIPTION OF THE DRAWINGS

Without restricting the full scope of this invention, the preferred form of this invention is illustrated in the following drawings.

DESCRIPTION OF THE PREFERRED EMBODIMENT(S)

Figure 1:
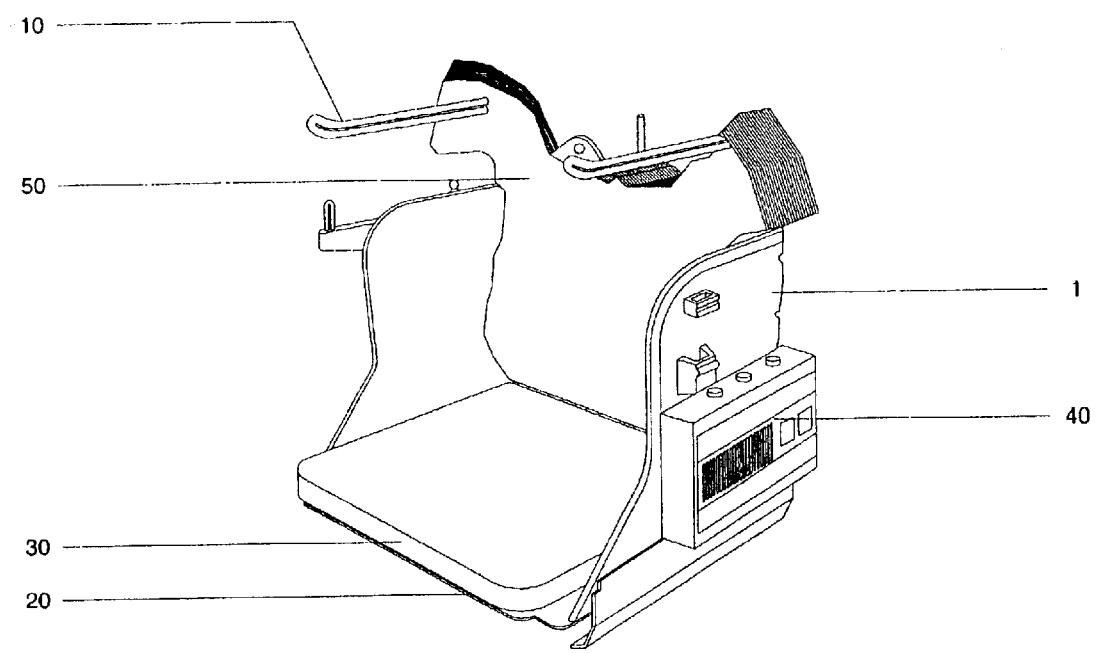
FIG. 1 shows the preferred embodiment of the current invention.

Referring initially to FIG. 1, there is shown a preferred embodiment of the current invention. The major components of the bagger scale 1 are the wire rack 10, the base 20, the scale 30, the indicator 40 and the bags 50.

Figure 2:
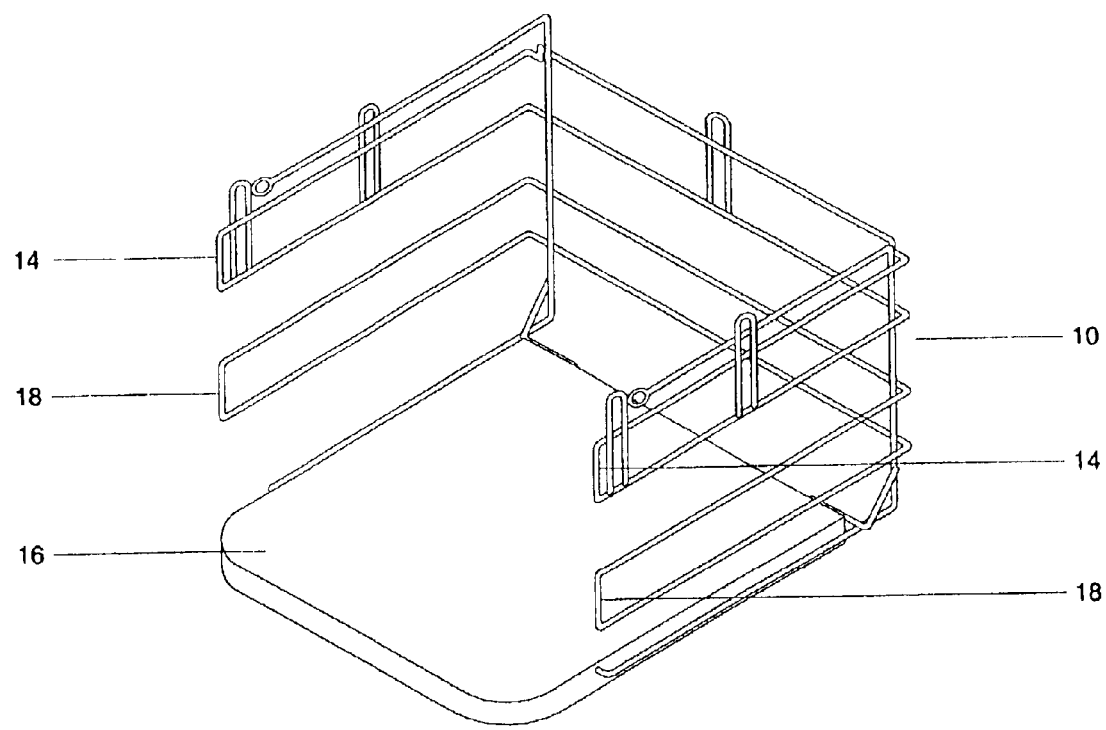
FIG. 2 shows the wire rack of the scale.

FIG. 2 shows the wire rack 10. It supplies the support structure for the bags 50. In the preferred embodiment it is formed out of a heavy wire composed of strong light-weight material. It has a back 12 with a plurality of hooks 14 that come out at a 90 degree angle from the back 12 and perpendicular to the sides of the wire rack 10. The hooks 14 have a length of six inches and a width of one inch. The hooks 14 are used to hang the bags 50 on. The hooks 14 are on the front side of the wire rack 10 and are almost at the top of the wire rack 10. The wire rack 10 also has sides 18 that are perpendicularly connected to the back 12 and run parallel with the hooks 14. The wire rack 10 has a base holder 16 that is 90 degrees from the back and perpendicular to the bottom of the wire rack 10. The dimensions in the preferred embodiment would be 14" in height by 16" wide by 13.5" long.

Figure 3:
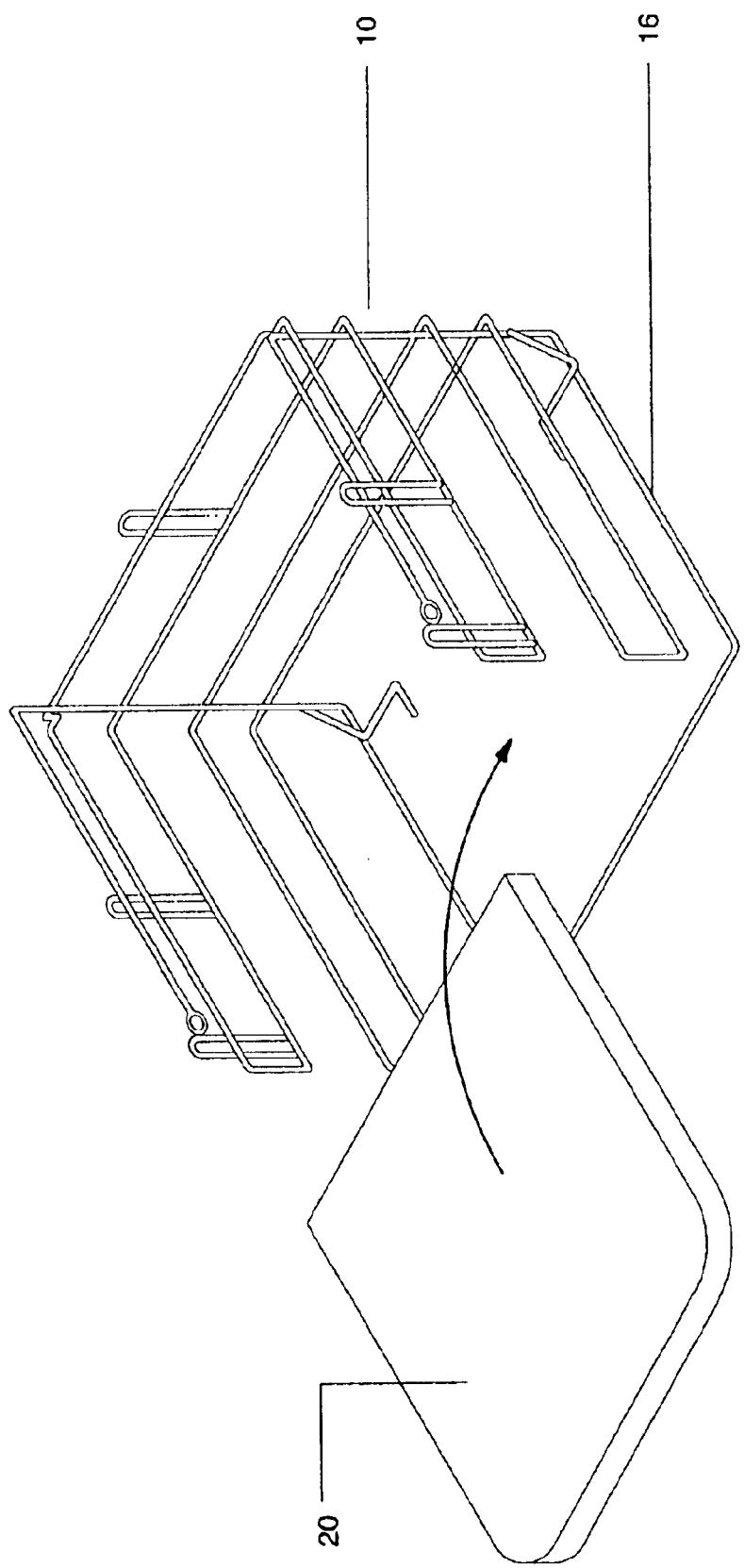
FIG. 3 shows the base.

As shown in FIG. 3, the base 20 is placed in the base holder 16. The base 20 is made of a heavy solid material such as a heavy plastic. The base 20 provides stability to the bagger scale 1.

Figure 4:
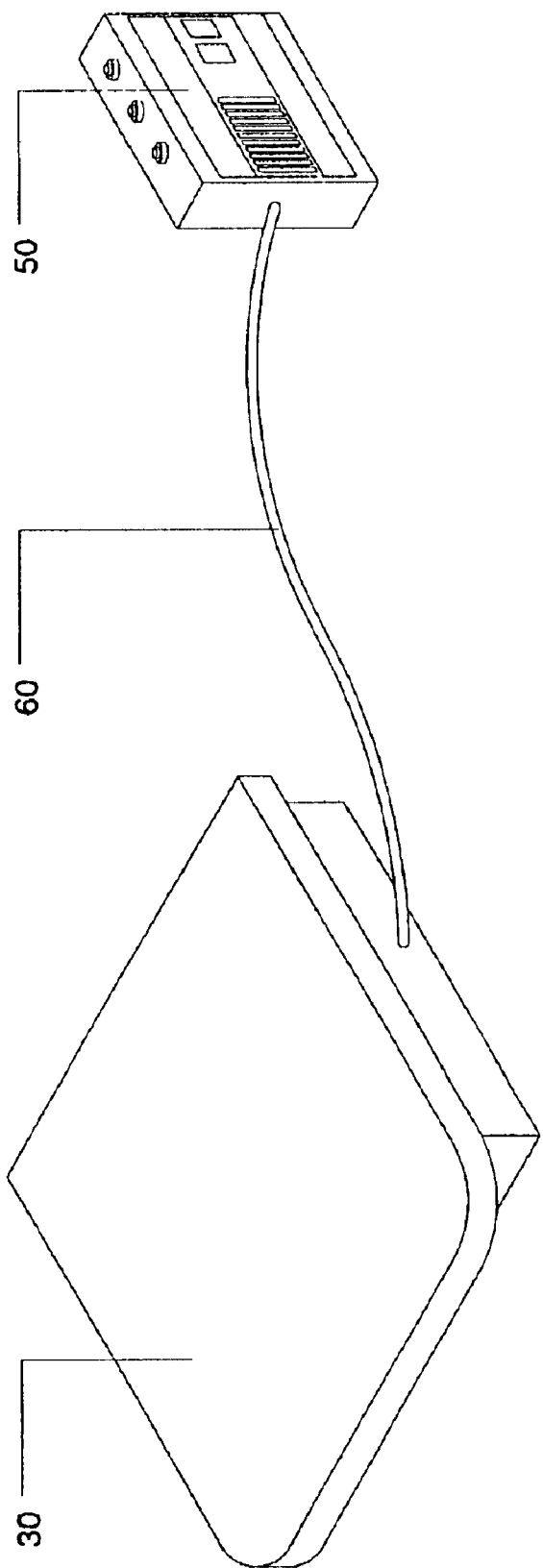
FIG. 4 shows the scale.

FIG. 4 displays the scale 30. Any industry standard low profile scale with the capability of electronic output can be used through an output means. In the preferred embodiment, the scale 30 would have an increment size of 0.1 lb/0.05 kg. The scale 30 would be connected to the indicator 40 through a connecting means 60. The connecting means 60 can be some type of electronic cable, although an RF or some other type of connection would be possible. The scale 30 would have a stainless steel platter 32 for easy cleaning.

Figure 5:
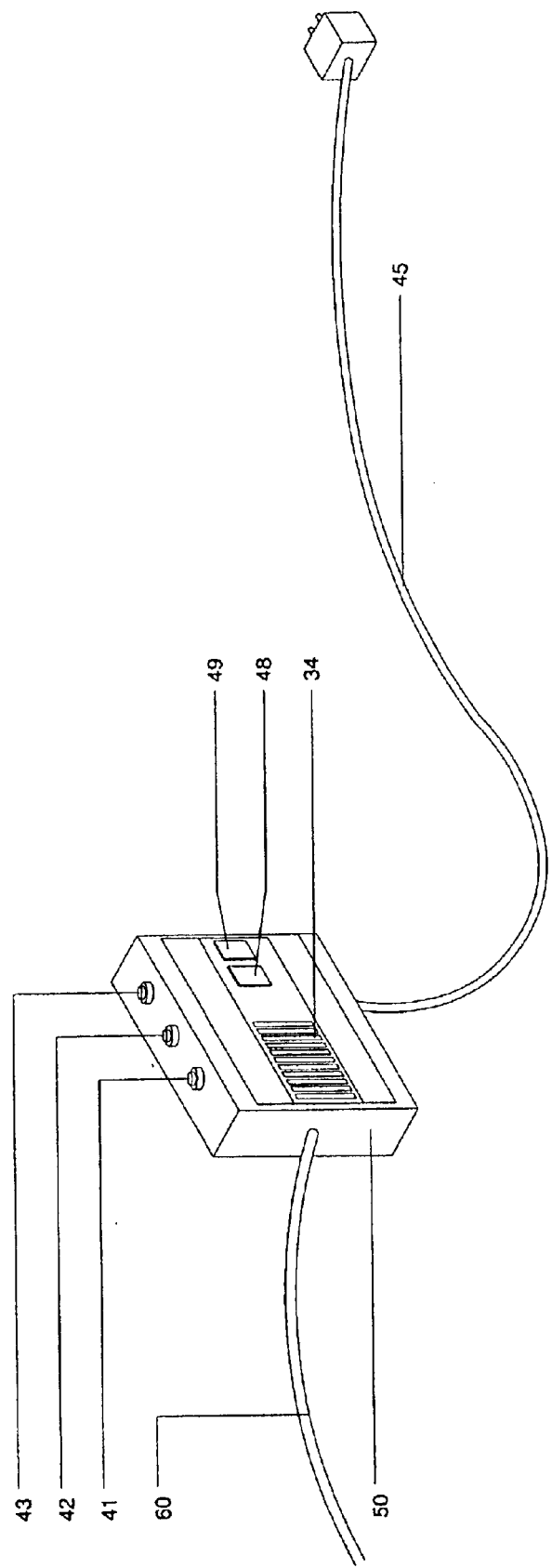
FIG. 5 shows the indicator.
Figure 6:
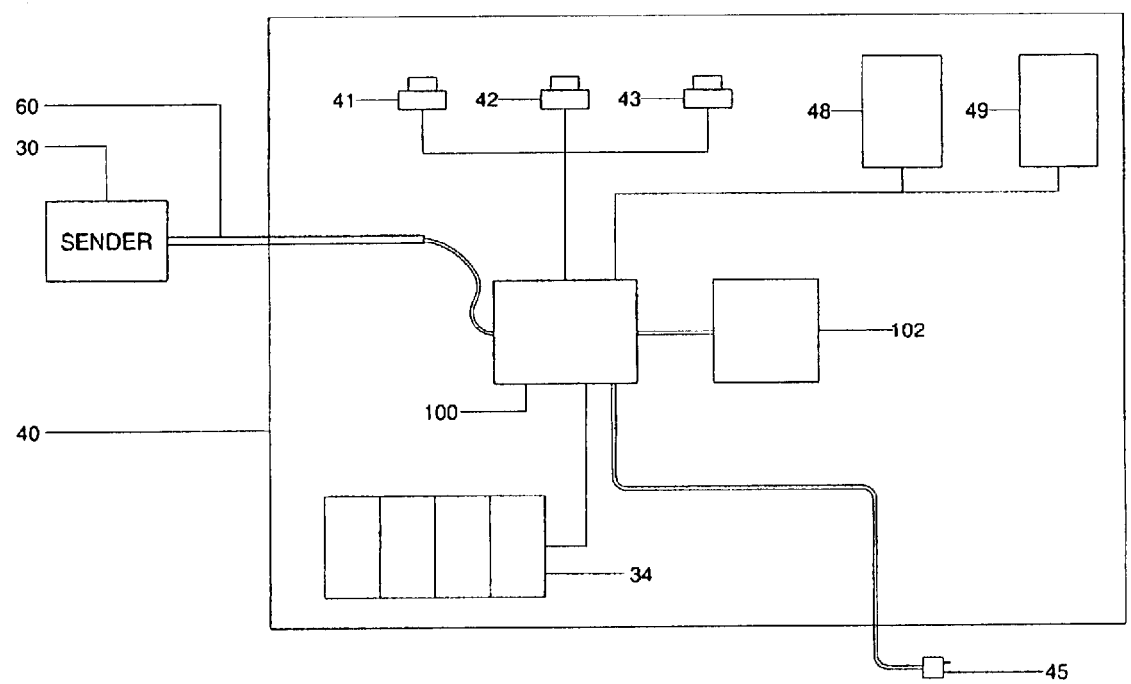
FIG. 6 is a diagram of the scale and indicator components.

FIG. 5 displays the indicator 40. In the preferred embodiment the indicator would have an LCD air vacuum florescent display 34. The LCD display 34 would display the weight contained in the plastic bag 50. The indicator 40 would have two setpoints, a low target weight and a high target weight. The indicator would have a memory means 102 to store these values. The storage means 46 would be non-volatile memory. The indicator 40 would be connected to the scale 30 through the connecting means 60. The indicator 40 would have three LED displays, green 41, yellow 42 and red 43. The indicators 41, 42, and 43 would be positioned on the top of the indicator 40. The indicator 40 would have an AC adapter 45 to supply power to it and the scale 30. The indicator 40 would have some type of processing means 100. The processing means 100 compares the weight of the material in the bag 50 to the low and high targeted weights. The indicator 40 has keypress buttons. These buttons are zero 48 which resets the zero balance of the scale and an enter button 49 that lets you input values to the indicator such as the target low and high weight. FIG. 6 is an overview of the connection between the scale 30 and the indicator 40. Much of the electronic circuitry is not shown as it is standard in the industry. The scale 30 is connected to the indicator 40 through a connecting means 60. An AC adapter 45 is connected to the indicator 40 and power is run to the scale through the connecting means 60. The weight of the bag 50 is generated by the scale 30 and transmitted through the connecting means 60 to the processor 100. The processor 100 is connected to the memory means 102, the indicator LEDs 41, 42 and 43, LCD display 34, and the keypress buttons 48 and 49.

Figure 7:
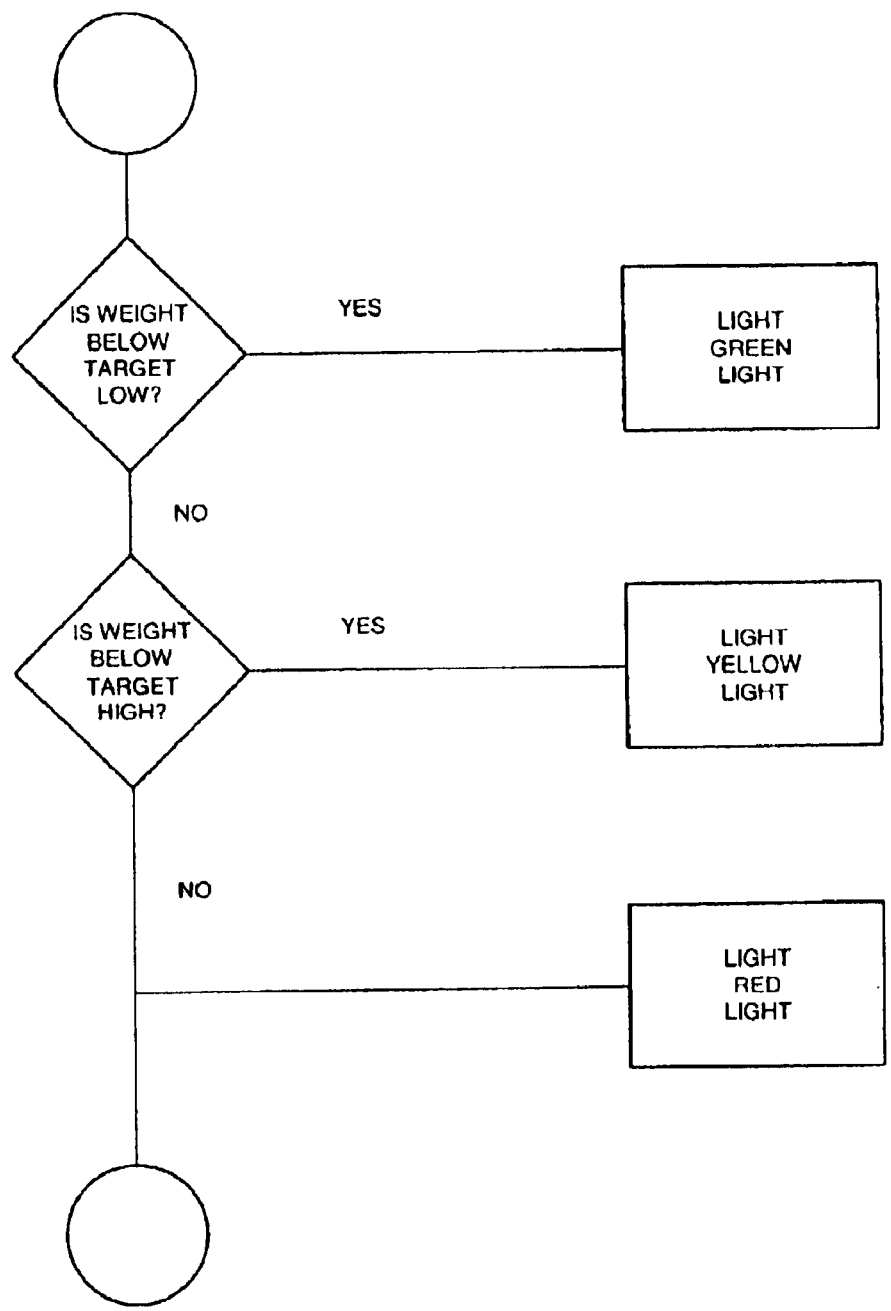
FIG. 7 is a flow diagram of the indicator logic.

FIG. 7 is a process flow diagram for the current invention. The processor 100 periodically checks the weight and compares it to the target low weight. If it is below the targeted low weight the green indicator 41 is lit. If it is above the target high weight the red indicator 43 is lit. If it is not below the target low weight or above the target high weight then the yellow indicator 42 is lit. The process is continually repeated.

Additional Embodiments

One additional embodiment, as shown in FIG. 6, would provide an audio warning through a speaker 70 in the indicator 40 that the targeted low weight has been reached or that the targeted high weight has been exceeded. This would have the advantage that the bagger would not have to continually be looking at the indicator lights.

Operation

In order to use bagger pad scale 1 to weigh the contents of a plastic bag 50, the bagger first pulls the plastic bag 50 out on the hooks 14 so that it is squarely above the scale 30. The bagger then fills the bag until the yellow indicator 42 is lit or the bag is full. Once it is lit, the bagger removes the plastic bag 50 and places it either to the side or in a bagger carrying device such as a cart. The bagger then repeats the steps until all of the customer's items that can be placed in a plastic bag have been placed in a plastic bag 50.

Advantages

The previously described embodiments of the present invention have many advantages including the prevention of overfilling and under-filling of plastic grocery bags with its adverse environmental effects.

Although the present invention has been described in considerable detail with reference to certain preferred versions thereof, other versions are possible. For example, a different type of base could be used, a different type of indicator besides lights could be used, the platter could be made of a different material, the scale and indicator could be a single unit, the scale could have its own power supply or it could be used with something besides plastic bags. Therefore, the point and scope of the appended claims should not be limited to the description of the preferred versions contained herein.

What is claimed is:

1. a process for filling a container consisting of:

a) having a wire rack;

b) having a scale;

c) having an indicator; and d) filling the container until the indicator indicates to stop.

2. The process according to claim 1 wherein the scale and the indicator are connected through a connecting means.

3. The process according to claim 1 which includes having the indicator have a plurality of lights.

4. The process according to claim 1 which includes having a base.

5. The process according to claim 1 which includes having a base attached to the wire rack.

6. The process according to claim 1 which includes having a base which is attached to the wire rack and having the scale positioned on the base.

7. The process according to claim 1 which includes having the indicator have a plurality of indicators.

8. The process according to claim 1 which includes having the indicator lighting a light to indicate an under-fill status, lighting a light to indicate an targeted weight status and lighting a light to indicate an overfill status.

9. The process according to claim 1 which includes having the indicator lighting a green light to indicate an under-fill status, lighting a yellow light to indicate targeted weight status and a lighting a red light to indicate an overfill status.

10. The process according to claim 1 which includes having said indicator indicating an under-fill status, indicating a targeted weight status and indicating an overfill status.

11. The process according to claim 1 which includes having a target high weight and a target low weight.

12. The process according to claim 1 which includes having a speaker connected to said indicator.

13. The process according to claim 1 which includes having said containers are plastic bags.

14. A device consisting of:

a) a wire rack;

b) a scale; and c) an indicator where said indicator has a plurality of lights.

15. The device according to claim 14 in which the indicator has a light to indicate an under-fill status, a light to indicate an targeted weight status and a light to indicate an overfill status.

16. The device according to claim 15 in which the indicator has a green light to indicate an under-fill status, a yellow light to indicate targeted weight status and a red light to indicate an overfill status.

17. The device according to claim 16 in which has a target high weight and a target low weight.

18. The device according to claim 17 which includes a speaker.

19. A device consisting of:

a) a wire rack;

b) a scale; and c) an indicator where said indicator has a plurality of indicators.

20. The device according to claim 19 in which the indicator indicates an under-fill status, the indicator indicates a targeted weight status and the indicator indicates an overfill status.

21. The device according to claim 19 in which has a target high weight and a target low weight.

22. The device according to claim 19 which includes a speaker.

* * * * *